March 31, 1931.  K. P. BILLNER  1,798,924
METHOD OF PLACING POROUS CONCRETES
Filed Feb. 26, 1930
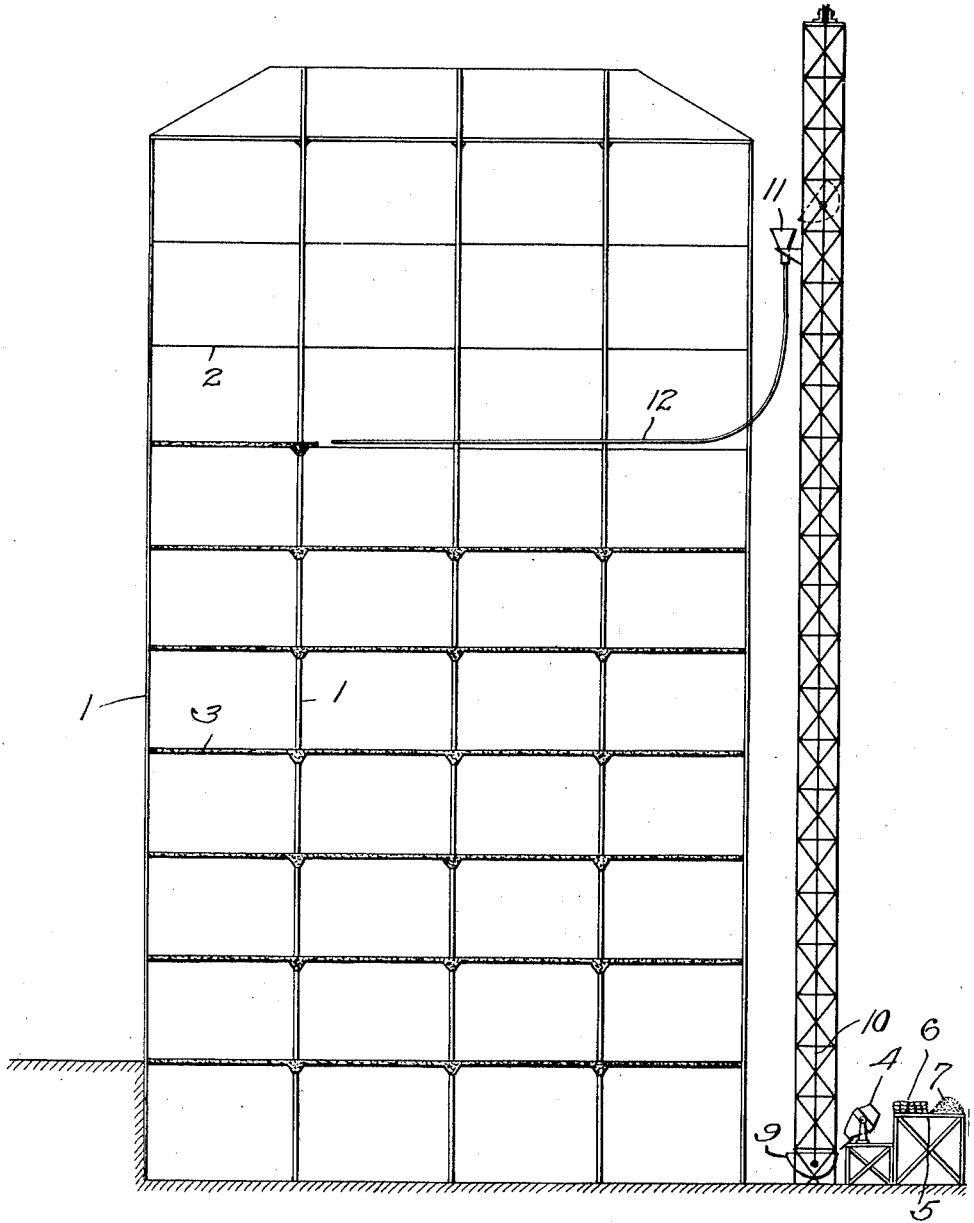
INVENTOR.
Karl P. Billner
BY
Frank L. Hyer
ATTORNEY.

Patented Mar. 31, 1931

1,798,924

UNITED STATES PATENT OFFICE

KARL P. BILLNER, OF NEW YORK, N. Y., ASSIGNOR TO THE AEROCRETE CORPORATION OF AMERICA, OF NEW YORK, N. Y., A CORPORATION OF DELAWARE

METHOD OF PLACING POROUS CONCRETES

Application filed February 26, 1930. Serial No. 431,550.

My invention relates to an improved method of placing porous concrete. Porous concrete or so-called aerocrete is a form of concrete in which a substantial portion of the mass is composed of cells or pores separated by thin walls, thereby resulting in a product having somewhat the appearance of pumice stone and possessing remarkable heat insulating and sound-proofing qualities. At the same time it may be made extremely light, so that when used for example in the construction of the floors or partitions of a steel building, the framework may be made much lighter than is possible when ordinary non-porous concrete or similar building material is used.

Porous concrete is made according to the patent of Aylsworth and Dyer, No. 1,087,098, dated February 14, 1914, and employs in addition to the usual mix of Portland cement and water, (with or without a suitable aggregate such as sand) a material having the property of bringing about the generation of gas within the mass prior to setting, so as to result in the formation of gas bubbles which produce pores therein. The patent refers to powdered metallic aluminum as a desirable material in bringing about this aerating effect, causing a decomposition of water within the mass to form hydrogen bubbles, but other substances may be employed to produce this result.

It is preferable but not necessary to use Portland cement in the making of aerocrete. However, other cementitious materials may be employed for the purpose which have the property of setting from a semi-liquid or slurry-like mass. As above stated, it is not necessary that an aggregate material should be used, although it is preferable to employ one for reasons of economy and strength. It is important in making porous concrete or aerocrete that the pores or cells should be uniformly distributed throughout the mass. Unless this is done, the specific gravity of the material becomes objectionably high, with obvious disadvantage.

Heretofore in placing porous concrete it has been the practice to thoroughly mix the several ingredients in a concrete mixer after which the material is transported to the place of use. If the material is poured directly from the mixer into the molds or forms so that a substantial time interval does not elapse, the resulting product is of suitable quality because the chemical reaction is permitted to take place while all portions of the mass are quiescent. Therefore, the gas bubbles are permitted to distribute themselves uniformly, while the aggregate if used, has little opportunity of settling out. If however, a substantial delay takes place after mixing the ingredients and before the concrete is placed, time is allowed during which a substantial amount of the generated gas may escape. The eventual product therefore, will be heavier and generally inferior to that secured where the placing of the concrete is effected with the minimum of delay after the mixing operation.

The objections to which I have referred have been especially noticeable in the case of constructing floors of porous concrete. With such work, the concrete mixer is necessarily a substantial distance from portions of the floor upon which the concrete is to be placed. It has been the practice, after mixing, to transport the porous concrete from the mixer in wheel barrows, concrete buggies, and similar vehicles. During the time of transportation, opportunity is allowed for a substantial part of the gas to be lost so that the resulting product will be objectionably dense. This loss of gas is furthermore accelerated by reason of the shaking and agitation to which the mass will be subjected in transit. Moreover, this inevitable disturbance of the mass results in an undesirable settling out of the aggregate so that the resulting product when in place is not only objectionably dense but is not uniform and homogeneous as is desirable.

Furthermore in the case of a relatively thin body of porous concrete such as a floor when the material is dumped forcibly from the conveying implement, additional opportunity is offered for a loss of gas with additional deterioration in the quality and character of the finished product. And of course the objectionable effects referred to are emphasized by the fact that the layer is relatively thin so that the paths through which the gas may escape are comparatively short.

I have found after a very long practical experience that the laying of porous concrete to constitute a floor represents the maximum of difficulty in securing satisfactory results. My present invention finds its principal utility in connection with the make-up of floors of porous concrete, although it is not limited to this use and may be employed in any connection where advantage can be taken of its desirable characteristics.

Broadly stated, my invention consists in a method of laying porous concrete in which the concrete immediately after mixing is subjected to a counteracting pressure, which without retarding the chemical reaction will oppose the development of gas bubbles, whereby a pressure will be built up in the mass. Thereafter, when the concrete is laid, the counteracting pressure is released and thereupon the gas bubbles within the mass will have an opportunity to expand with relative rapidity so as to puff up the mass and be distributed uniformly through the same with very little loss due to escape from the exposed surface.

I find in practice, that as the porous concrete approaches the set and hard condition where it can no longer expand, it passes from the wet slurry like form to a jelly-like mobile and plastic mass, in which condition the formation of gas bubbles is produced in a most effective way and with least loss.

Preferably, the porous concrete is transported under a condition of counteracting pressure as explained, in such a way that the mass will be under constant agitation, which very effectively prevents the aggregate from settling out so that the resulting final product is uniform in structure.

I prefer to apply counteracting pressure by directing the porous concrete to the locality in which it is to be placed through a pipe or conduit through which the material will be forced and from which it will be ejected in any suitable way, such as by gravity. Therefore, while the porous concrete is progressing through the pipe no opportunity will be allowed for the gas bubbles to escape, but instead a pressure will be built up within the mass. At the same time the concrete in being forced through such a pipe will be caused to be agitated, so that no opportunity will be allowed for the aggregate to settle out. From the mouth of the pipe the concrete is ejected to the place where it is to be laid.

In this way the aggregate, if used, is very evenly distributed throughout the mass. The gas bubbles are under substantial pressure so that they immediately have an opportunity to expand. In so expanding, the consistency of the mass becomes mobile and jelly-like, so there is very little tendency for the bubbles to escape, owing to the friction of the mass through which they would have to pass in order to do so. As a matter of fact, each individual bubble simply expands in situ until the pressure is equalized.

From the foregoing it will be seen that I have developed a method having for its object the placing of porous concrete in such a way that the operations will be facilitated and made cheaper and a product of superior quality will be secured.

I am, of course, familiar with the fact that in the placing of ordinary non-porous concrete, it has been proposed to make use of pipes through which the concrete, grout or slurry will be forced to the place of deposit. So far as I am aware with such prior methods, entire success has been secured only by actually blowing the concrete through the pipe with relatively enormous volumes of air whereby the concrete will be carried along like particles of sand in a storm. With my present invention, when porous concrete is transported through a pipe unforeseen and highly desirable results take place, for which there is no counter-part or analogy when the attempt is made to place ordinary non-porous concrete by means of a pipe or hose.

In order that the invention may be better understood, attention is directed to the accompanying drawing forming a part of this specification and which is shown in cross section the steel framework of a building and in diagram a suitable apparatus used in connection therewith for placing floors of porous concrete therein. This is purely illustrative of one example of a use to which the invention may be put and one example of an apparatus for carrying the method into effect.

The vertical members 1, 1 are provided with cross members 2 of any suitable type on which floors 3 of porous concrete are adapted to be placed or cast, in accordance with my improved method. The apparatus shown in the illustration comprises a concrete mixer 4 of any suitable type, a platform 5 upon which may be placed a supply of cement 6 and a supply of sand 7. An elevator 8 is shown, the bucket 9 of which is moved by power up and down by means of a cable 10. In its lowermost position the bucket 9 is adapted to receive the contents of the mixer 4. In its uppermost position the bucket 9 dumps its contents into a hopper 11 with which connects a pipe or hose 12, preferably of reinforced rubber or other flexible material.

In carrying my invention into effect with the illustrative apparatus shown, I proceed as follows:

The mixture of cement (preferably Portland cement) water, an aggregate, such as sand, and the gas producing element such as powdered aluminum, all in the proper proportion, is introduced into the mixer 4 and thoroughly and intimately mixed therein. If the cement is deficient in lime so that the chemical reaction will not take place to an adequate extent, sufficient free lime may be added as pointed out in the Aylsworth and Dyer patent. After mixing, the mass is dumped into the bucket 9 by gravity and is immediately raised by the elevator 8 and emptied into the hopper 11. From this hopper 11 it flows by gravity through the pipe 12 to the proper place on the floor and a layer of the required thickness is deposited thereon.

The time during which the cement mass is exposed to the atmospheric pressure in the bucket 9 is a matter of a few seconds, even with a building of substantial height. Therefore, while the mass is being mixed and is being raised to the hopper 11, the chemical reaction has taken place only in its incipient stages.

As the concrete flows by gravity through the pipe or hose 12 the chemical reaction is given the opportunity to progress to a very substantial extent. Hydrogen gas in large quantities is generated throughout the mass and results in the formation of gas bubbles which, however, are prevented from developing in size by reason of the counteracting pressure imposed upon the mass by the walls of the pipe. These bubbles therefore remain very small in size while the pressure within the mass slowly builds up. They remain separated and evenly distributed with no tendency to coalesce.

The concrete mixture within the pipe remains free flowing and readily passes through the pipe. No opportunity is offered for the concrete to reach the jelly-like consistency referred to as takes place when the gas bubbles have reached their maximum size.

As the concrete passes through the pipe it will be very substantially agitated so that there will be no tendency of the sand or other aggregate to settle out or destroy the homogeneous nature of the mass.

As soon as the concrete leaves the pipe and is placed in position on the floor the counteracting pressure will be removed. Therefore the compressed gas bubbles will have the opportunity to immediately expand causing the mass to be aerated to the required extent.

I find in practice that when my improved method is followed the operation of placing the concrete is not only very substantially expedited but very material economies are effected. The waste of gas is greatly reduced as compared to methods in which the porous concrete after mixing requires to be transported by wheelbarrows or the like. With the latter operation, there is always an aerating action during transportation with the possibility of the concrete overflowing the container with consequent loss but such a thing is impossible with my method.

Not only is the method cheaper and quicker as compared to the practice heretofore followed, but as I have pointed out, the resulting product is more uniform and homogeneous, the cells or pores being more equal in size and being distributed more uniformly throughout the mass. The product is also characterized by the fact that there is no settling out of the aggregate when used, as is likely to be the case with the practice now followed.

Heretofore in the production of porous concrete, it has been proposed to form the cells or pores therein by ejecting air into the mass after mixing to form air bubbles, the air treatment being continued until the concrete has reached the jelly-like consistency referred to whereby each cell is so to speak self-sustaining, the friction of the mass being sufficient to prevent the several air bubbles from escaping. I find that when the porous concrete is to be poured or placed through a pipe or hose it is not practicable to aerate the same by injecting air, for the reason that a condition of equilibrium is not reached until the consistency of the concrete is such that it cannot be effectively poured.

Results of a different and far superior order are secured when the pores or cells are formed by a chemical reaction within the mass because in this case the bubbles, under the effect of counteracting pressure, remain very small and pressure is built up within them, so that when the counteracting pressure is released the mass will immediately expand to the desired ultimate density.

Having now described my invention, what I claim is new therein and desire to secure by Letters Patent is as follows:

1. The method of placing concrete which consists in intimately mixing a mixture of cement, water and a gas-producing agent, in applying a counteracting pressure to the mixture to prevent expansion of gas bubbles and permit a pressure to develop within the mass, the counteracting pressure being applied while the chemical reaction is in its incipient stages, in transporting the mass to the place of use, in relieving the counteracting pressure and in depositing the mass on or in the place of its eventual application.

2. The method of placing concrete which consists in intimately mixing a mixture of Portland cement, water, and a gas-producing agent, in applying a counteracting pressure to the mixture to prevent expansion of gas bubbles and permit a pressure to develop within the mass, the counteracting pressure being applied while the chemical reaction is in its incipient stages, in transporting the mass to the place of use, in relieving the counteracting pressure and in depositing the mass on or in the place of its eventual application.

3. The method of placing concrete which consists in intimately mixing a mixture of cement, water, an aggregate and a gas-producing agent, in applying a counteracting pressure to the mixture to prevent expansion of gas bubbles and permit a pressure to develop within the mass, the counteracting pressure being applied while the chemical reaction is in its incipient stages, in transporting the mass to the place of use, in relieving the counteracting pressure and in depositing the mass on or in the place of its eventual application.

4. The method of placing concrete which consists in intimately mixing a mixture of cement, water, and aluminum powder, in applying a counteracting pressure to the mixture to prevent expansion of gas bubbles and permit a pressure to develop within the mass, the counteracting pressure being applied while the chemical reaction is in its incipient stages, in transporting the mass to the place of use, in relieving the counteracting pressure and in depositing the mass on or in the place of its eventual application.

5. The method of placing porous concrete which consists in conveying a continuous moving stream comprising an intimate mixture of cement, water, and a gas-producing agent, in confining the moving stream under sufficient head, and before chemical reaction has progressed beyond its incipient stages, to permit a counter-acting pressure to develop therein and prevent the expansion of gas bubbles, in directing the confined moving stream to the place of use, and in relieving the counter-acting pressure whereby the pressure within the mass will cause the same to expand.

6. The method of placing porous concrete which consists in conveying a continuous moving stress comprising an intimate mixture of Portland cement, water, and a gas-producing agent, in confining the moving stream under sufficient head, and before chemical reaction has progressed beyond its incipient stages, to permit a counter-acting pressure to develop therein and prevent the expansion of gas bubbles, in directing the confined moving steam to the place of use, and in relieving the counteracting pressure whereby the pressure within the mass will cause the same to expand.

7. The method of placing porous concrete which consists in conveying a continuous moving stream comprising an intimate mixture of cement, water, a gas-producing agent and sand, in confining the moving stream under sufficient head, and before chemical reaction has progressed beyond its incipient stages, to permit a counteracting pressure to develop therein and prevent the expansion of gas bubbles, in directing the confined moving stream to the place of use, and in relieving the counteracting pressure whereby the pressure within the mass will cause the same to expand.

8. The method of placing porous concrete which consists in conveying a continuous moving stream comprising an intimate mixture of cement, water, and aluminum powder, in confining the moving stream under sufficient head, and before chemical reaction has progressed beyond its incipient stages, to permit a counteracting pressure to develop therein and prevent the expansion of gas bubbles, in directing the confined moving stream to the place of use, and in relieving the counteracting pressure whereby the pressure within the mass will cause the same to expand.

KARL P. BILLNER.